United States Patent [19]

Oldenburg et al.

[11] 3,946,776
[45] Mar. 30, 1976

[54] DUAL SHEAR BLADE ASSEMBLY

[75] Inventors: Dorrance Oldenburg, Peoria; Robert L. Fischer, New Lenox, both of Ill.

[73] Assignee: Caterpillar Tractor Co., Peoria, Ill.

[22] Filed: Apr. 8, 1975

[21] Appl. No.: 566,165

[52] U.S. Cl. .............................. 144/34 E; 144/3 D
[51] Int. Cl.² ......................................... A01G 23/08
[58] Field of Search . 144/3 D, 34 R, 34 E, 309 AC, 144/2 Z

[56] References Cited
UNITED STATES PATENTS

| | | | |
|---|---|---|---|
| 3,503,429 | 3/1970 | Whisler | 144/34 E |
| 3,509,922 | 5/1970 | Lundberg | 144/34 E X |
| 3,565,141 | 2/1971 | Galis | 144/34 E |
| 3,627,003 | 12/1971 | Kessler et al. | 144/3 D X |
| 3,731,720 | 5/1973 | Moser et al. | 144/34 E X |

*Primary Examiner*—Travis S. McGehee
*Assistant Examiner*—W. D. Bray
*Attorney, Agent, or Firm*—Charles E. Lanchantin, Jr.

[57] ABSTRACT

A dual shear blade assembly for cutting through an article includes a frame having an outwardly opening article receiving slot therein, a first shear blade arrangement pivotally mounted on the frame and movable between an open position outwardly adjacent one side of the slot to a closed position within the slot, a second shear blade arrangement pivotally mounted on the frame and movable between an open position outwardly adjacent the opposite side of the slot to a closed position within the slot, a linkage apparatus which pivotally interconnectably couples the first and second shear blade arrangements for coordinated closing movement and separating opening movement thereof, and a motoring device pivotally connected to the frame and one of the first and second shear blade arrangements for powerably closing it, and thereby also the other one of said first and second shear blade arrangements for cleanly severing the article disposed in the slot.

12 Claims, 2 Drawing Figures

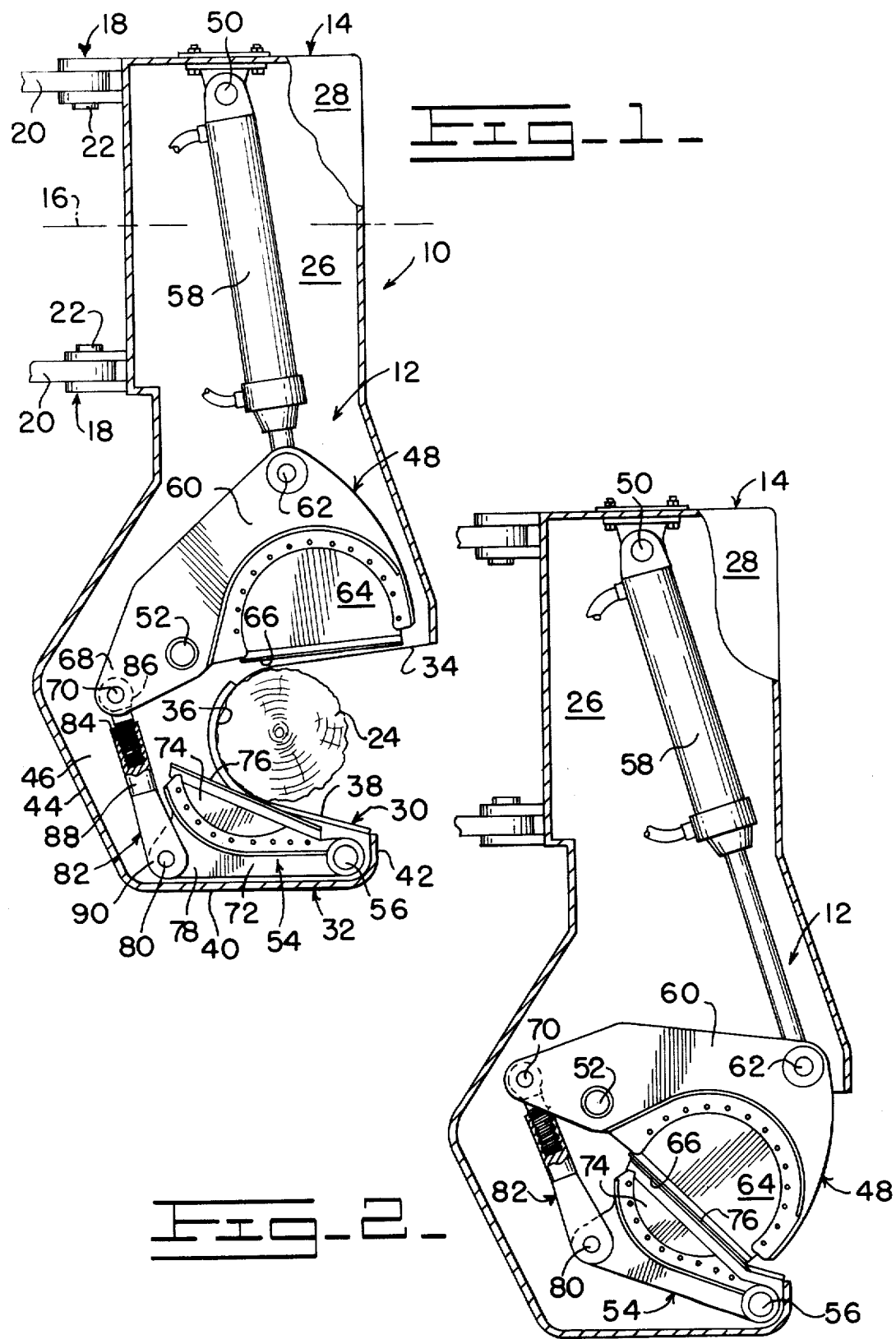

DUAL SHEAR BLADE ASSEMBLY

BACKGROUND OF THE INVENTION

In general, dual shear blade assemblies are preferred by the tree harvesting industry because considerably less tearing and wood damage occurs to a tree trunk as it is being cut, and less force is required to urge the individually shorter and thinner cutting blades part way through the wood. Representative of these dual shear blade assemblies are U.S. Pat. No. 3,503,429 issued Mar. 31, 1970 to E. L. Whisler and U.S. Pat. No. 3,627,003 issued Dec. 14, 1971 to K. Q. Kessler et al. The former uses a pair of opposing shear blade arrangements which are pivotally mounted on the frame, and each of which is individually controlled by a separate hydraulic actuating cylinder. Undesirably, the second hydraulic cylinder adds to the overall cost of the tree harvester and increases its overall size which, for example, can decrease its ability to be manipulated into a group of closely spaced trees. On the other hand, the latter of the aforementioned patents includes a pair of shear blade arrangements which are cooperatively manipulated by a single hydraulic cylinder. Such construction, however, includes a floating-type cylinder mounting that disadvantageously contributes to unsymmetrical opening and closing movement of the opposing shear blade arrangements. In addition, with the scissors type closing action of the cutting edges, a V-shaped slot is formed which creates forces tending to longitudinally separate the tree harvester and the tree which is being cut, which subsequently results in alignment problems and increased damage to the tree as it is being processed.

Other examples of prior art are disclosed in U.S. Pat. No. 3,509,922 issued May 5, 1970 to J. P. Lundberg and U.S. Pat. No. 3,565,141 issued Feb. 23, 1971 to A. J. Galis. However, the former construction incorporates an undesirably complex mechanism for simultaneously shearing a tree with three blades, and the tree must be inserted within a circular hole or sleeve during the processing thereof. While the latter construction, in contrast, is able to conveniently shear a standing tree, its three-blade construction is also relatively complex and costly, and incorporates one sliding blade with accompanying bearing support disadvantages.

As far as is known, not before the dual shear blade assembly disclosed in U.S. patent application Ser. No. 550,329 filed Feb. 18, 1975 by L. A. Wirt, now U.S. Pat. No. 3,927,704 and assigned to the assignee of the present invention, have many of the aforementioned problems been overcome. The reference construction can relatively more cleanly sever a tree because the pivotal connections for the dual shear blade arrangements are positioned on the frame in such a way that an improved mechanical advantage exists, and the tree is positively biased toward a fully retained position within the tree receiving slot by the penetrating cutting engagement of the shear blade arrangements. While such construction is a considerable advancement over the prior art, a second actuating cylinder is utilized therein and the tree harvester frame is larger than desired in order to accommodate it.

SUMMARY AND OBJECTS OF THE INVENTION

Therefore, to overcome the above-noted problems, it is an object of the present invention to provide an improved dual shear blade assembly for a tree harvester which is more simply and economically adapted to cleanly sever a tree.

Another object of the present invention is to provide a dual shear blade assembly of the aforementioned type which is relatively compact, yet rugged in its construction.

Another object of the present invention is to provide a dual shear blade assembly of the character described which provides mechanically coordinated interconnecting movement of the dual shear blade arrangements in order to permit a single hydraulic cylinder to be utilized for effective cutting of a tree.

Other objects and advantages of the present invention, including the ability to conveniently adjust the opposing shear blade arrangements for full length abutting closing contact, will become more readily apparent upon reference to the accompanying drawings and the following description.

BRIEF DESCRIPTION OF THE DRAWINGS

FIG. 1 is a horizontal sectional view of the dual shear blade assembly of the present invention showing the dual shear blade arrangements thereof in their open tree receiving positions.

FIG. 2 is a horizontal sectional view similar to FIG. 1 but showing the dual shear blade arrangements disposed in their fully closed tree severing positions.

DESCRIPTION OF THE PREFERRED EMBODIMENT

Referring to FIG. 1, a tree harvesting apparatus 10 is shown which includes a dual shear blade assembly 12 which is constructed in accordance with the present invention. The dual shear blade assembly includes a laterally elongated boxlike frame 14 which extends laterally outwardly in an offset manner relative to a central longitudinal axis 16. Suitable pairs of ears, such as shown at 18, extend longitudinally rearwardly from the back of the frame to permit a laterally spaced pair of lift arms 20 to be coupled thereto. Such lift arms are pivotally associated with a wheeled vehicle or the like (not shown), and are pivotally secured to the ears through a pair of horizontally arranged pivots 22. In this manner, the tree harvesting apparatus is mountably carried and manipulated by the vehicle into a group of closely spaced trees for selecting an individual tree, such as shown at 24. It will be appreciated that the aforementioned pivots are disposed on the frame at an elevationally low level, and one or more additional pivotal connections (not shown) would be made at an elevationally higher level between the frame and the vehicle for stabilization purposes in the usual manner. Reference is herein made to the aforementioned U.S. patent application Ser. No. 550,329 now U.S. Pat. No. 3,927,704 for supplementary details of such mounting.

More particularly, the box-like frame 14 includes a lower plate member 26 and an upper plate member 28 substantially parallel thereto, and a forwardly divergingly opening slot 30 is defined therein adjacent the outermost corner thereof in convenient tree-receiving relation. This slot is cooperatively associated with a forwardly converging slender jaw 32 for aiding delivery of the tree 24 fully rearwardly into the slot. The plate member boundaries of the slot are defined by a pair of vertically separated inclined inner sidewall edges or sides 34 which extend rearwardly for tangent cooperation with a corresponding pair of arcuate tree-receiving rear walls 36, and a pair of inclined entry ramps or sides 38 which extend forwardly from the rear walls in a continuously smooth manner to form a common boundary with the slender jaw. An outermost sidewall 40 and a laterally narrow nose or apex portion 42 span vertically between the plate members and cooperate with the inclined entry ramps to define the principal boundaries of the jaw. As is clearly illustrated, the outermost sidewall extends only limitedly rearwardly to laterally blend with an inclined or convex-shaped rear wall 44 for the purpose of providing a relatively compact, linkage receiving cavity 46 within the box-like frame.

Upon further inspection of the drawings, it will be noted that a laterally elongated primary shear blade arrangement 48 is pivotally mounted protectably within the box-like frame 14 on a pair of substantially upright pivotal connections 50 and 52, while a longitudinally foreshortened secondary shear blade arrangement 54 is also pivotally mounted within the frame on a substantially upright pivotal connection 56. The primary shear blade arrangement includes an elongated reciprocable motoring device or hydraulic jack 58 which is rotatably anchored to the pivotal connection 50, and a primary shear blade member or bellcrank-shaped blade carrier 60 similarly anchored to the frame at the pivotal connection 52. It is further apparent that the powerably extendable or retractable hydraulic jack is coupled to the primary shear blade member at a pivotal connection 62 for swinging operation thereof, and also that the blade member includes a relatively large and replaceable primary shear blade 64 having a cutting edge 66 thereon. Pursuant to the present invention, a rearwardly extending arm 68 integral with the primary shear blade member and a pivotal connection 70 thereon are caused to move in the same relative rotational direction about the pivotal connection 52 as the movement of the pivot 62 with extension or retraction of the hydraulic jack. On the other hand, the foreshortened secondary shear blade arrangement 54 includes a secondary shear blade member or blade carrier 72 and a relatively small or narrow secondary shear blade 74 having a cutting edge 76 which, like the cutting edge 66, is removable in a conventional manner for replacement or servicing purposes. Also, the secondary shear blade member has an integral, rearwardly extending arm 78 thereon on which is disposed a pivotal connection 80 whose purpose will subsequently be described.

In accordance with the present invention, a rigid actuating link or linkage apparatus 82 of easily adjusted length interconnectably couples the primary shear blade arrangement 48 and the secondary shear blade arrangement 54 for assuring coordinated closing movement and separating opening movement thereof. More specifically, the actuating link includes a threaded rod portion 84 with an eye 86 thereon which is pivotally secured to the arm 68 of the primary shear blade arrangement at the pivotal connection 70, and an internally threaded cylinder portion 88 with an eye 90 thereon which is secured to the arm 78 of the secondary shear blade arrangement at the pivotal connection 80. Thus, in accordance with one of the main features of the present invention, the mechanical connection of the primary and secondary shear blade arrangements is such as to permit coordinated closing and opening movement therebetween through actuation of the single hydraulic jack 58.

OPERATION

While the operation of the present invention is believed clearly apparent from the foregoing description, further amplification will subsequently be made in the following brief summary of such operation. As shown in FIG. 1 the dual shear blade assembly 12 of the present invention is shown with the hydraulic jack 58 in its fully retracted position so that both the primary shear blade member 60 and the secondary shear blade member 72 are rotated about their respective pivotal connections 52 and 56 in a fully counterclockwise manner when viewing the drawing. Under these conditions, the primary shear blade 64 and secondary shear blade 74 are disposed in their fully open positions outwardly adjacent the opposite sides 34 and 38 of the tree-receiving slot 30.

The tree harvesting apparatus 10 may then be maneuvered by the vehicle to a point where the forwardly converging slender jaw 32 is conveniently positioned laterally outwardly of one tree 24 in a group of relatively closely spaced trees. Thereafter, forward movement of the vehicle causes the tree to be easily positively positioned fully rearwardly in the slot 30 by way of the inclined entry ramps 38 or the opposite inner sidewall edges 34, substantially as shown in FIG. 1. At this point other implements, such as shown in U.S. Pat. No. 3,669,161 issued June 13, 1972 to N. Gutman et al., and U.S. Pat. No. 3,717,185 issued Feb. 20, 1973 to R. L. Moser et al, and which are not shown, would normally be utilized to stabilizably grasp the tree at an elevated condition from the slot to more securely hold it in an upright relation with respect to the frame 14. For additional details in this regard, reference is herein made to U.S. patent application Ser. No. 550,329 mentioned previously above.

Pursuant to the present invention, the hydraulic jack 58 may then be extended to move the forwardly disposed pivotal connection 62 and the primary shear blade member 60 in a clockwise direction from the position shown in FIG. 1 to the position shown in FIG. 2 about the centrally disposed pivotal connection 52 on the frame 14. Simultaneously therewith, the rearwardly disposed pivotal connection 70 is moved in a clockwise manner about the same pivotal connection to cause the actuating link 82 to be positioned laterally inwardly, or upwardly when viewing the drawing. Because of the connecting link the rearwardly disposed pivotal connection 80 is also moved laterally inwardly, and the secondary shear blade arrangement 54 is rotated in a clockwise manner about its forwardly disposed pivotal connection 56. Thus, both the primary and secondary shear blades 64 and 74 cooperatively approach each other in an opposite endward closing manner until they are in full length abutting relation as shown in FIG. 2.

It is significant to note that during closing movement of the dual shear blade assembly 12 of the present invention the primary shear blade 64 exerts considerably more force than does the secondary shear blade 72 during its more extensive penetrating cutting engagement with the tree 24, which greater force tends to positively maintain the tree in its fully rearwardly disposed position in the slot 30. It is apparent that the secondary shear blade cuts through a smaller portion of the tree than the primary shear blade, and with lesser force, because of the mechanical advantages that accrue due to the locations of the pivotal connections 52, 56, 62, 70 and 80, and the interconnecting actuating link 82. In this way the secondary shear blade exhibits less tendency to urge the tree forwardly and out of the slot.

In accordance with one aspect of the present invention, the actuating link 82 is constructed to be easily adjusted. More particularly, the overall length or distance between the pivotal connections 70 and 80 may be conveniently increased or decreased by releasing one of these pivotal connections and screw threadably inserting or retracting the threaded rod portion 84 from within the internally threaded cylinder portion 88. A predetermined length of the actuating link is thus established sufficient to pivotally swing the secondary shear blade arrangement toward or away from the primary shear blade arrangement so that the cutting edges 66 and 76 are brought into full length abutting engagement at the proper location with respect to the tree with full closure thereof.

Thus, it is evident that the dual shear blade assembly 12 of the present invention is so constructed and arranged as to permit a single hydraulic jack 58 to be utilized for effective, clean cutting engagement of the opposing shear blades 64 and 74 with a tree or the like. This is in a large part achieved by the simple and compact link 82, and its fully pivotal interconnecting relationship with the arms 68 and 78 on the primary and secondary shear blade members 60 and 72, respectively. Such construction thereby effects mechanically coordinated approaching or separating movement of the blades in a relatively economical and compact manner, and while retaining a desirably high and disproportionate mechanical advantage of the cutting edge forces that better serve to retain the tree fully rearwardly in the slot 30.

It is contemplated that while the invention has been described in connection with a mechanically adjusted link 82, it is within the teachings thereof to replace it directly with a relatively compact fluid-adjustable or motorized link for interconnectably coupling the primary and secondary shear blade arrangements 48 and 54 between the pivotal connections 70 and 80.

While the invention has been described and shown with particular reference to a preferred embodiment, it will be apparent that variations such as that immediately described above are possible that would fall within the scope of the present invention which is not intended to be limited except as defined in the following claims.

We claim:
1. A dual shear blade assembly for cutting through an article, comprising;
   a frame having an outwardly opening article receiving slot therein;
   first shear blade means pivotally mounted on said frame and movable between an open position outwardly adjacent one side of said slot to a closed position within said slot;
   second shear blade means pivotally mounted on said frame and movable between an open position outwardly adjacent the opposite side of said slot to a closed position within said slot;
   linkage means pivotally interconnectably coupling said first and second shear blade means for coordinated closing movement and separating opening movement thereof; and
   motor means pivotally connected to said frame and one of said first and seond shear blade means for powerably closing it, and thereby also the other one of said first and second shear blade means for cleanly severing the article disposed in said slot.

2. The dual shear blade assembly of claim 1 wherein said first and second shear blade means are interconnected by said linkage means for swinging closing movement in the same relative rotational direction in an opposite endward manner, and with such swinging movement serving to better bias the article fully into said slot.

3. The dual shear blade assembly of claim 2 wherein said motor means is an extendable and retractable hydraulic jack.

4. The dual shear blade assembly of claim 3 wherein said linkage means includes a rigid, but adjustable interconnecting link.

5. A dual shear blade assembly for a tree harvesting apparatus, comprising;
   a frame having a forwardly opening slot defined therein adapted to receive a tree;
   primary shear blade means pivotally mounted on said frame and movable from an open position outwardly adjacent one side of said slot to a closed position within said slot for penetrating cutting engagement with the tree;
   secondary shear blade means pivotally mounted on said frame and movable from an open position outwardly adjacent the opposite side of said slot to a closed position within said slot;
   actuating link means pivotally coupled intermediate said primary and secondary shear blade means; and
   a hydraulic jack pivotally mounted on said frame and one of said primary and secondary shear blade means and powerably extendable or retractable for respectively effecting coordinated closing tree severing movement thereof and separating opening movement thereof.

6. The dual shear blade assembly of claim 5 wherein said actuating link means includes a threaded rod portion and a threaded cylinder portion so that with screw threaded adjustment therebetween said primary and secondary shear blade means may be better interrelatably positioned for substantially full length closing contact.

7. The dual shear blade assembly of claim 6 wherein said primary shear blade means includes a blade carrier having a centrally disposed pivotal connection to said frame, a forwardly disposed pivotal connection to said hydraulic jack, and a rearwardly disposed pivotal connection to said actuating link means.

8. The dual shear blade assembly of claim 7 wherein said secondary shear blade means includes a blade carrier having a forwardly disposed pivotal connection to said frame and a rearwardly disposed pivotal connection to said actuating link means.

9. A dual shear blade assembly for a tree harvesting apparatus, comprising;
   a frame having an outwardly opening slot defined therein;
   a primary shear blade arrangement including a primary shear blade carrier centrally pivotally mounted on said frame and a primary shear blade;
   a secondary shear blade arrangement including a secondary shear blade carrier forwardly pivotally mounted on said frame and a secondary shear blade;
   a hydraulic jack pivotally mounted intermediate said frame and said primary shear blade carrier for powerably closing and opening it; and actuating link means pivotally connecting said secondary shear blade carrier to said primary shear blade carrier for effecting coordinated closing and separating movement thereof when said primary shear blade carrier is powerably moved.

10. The dual shear blade assembly of claim 9 wherein said actuating link means is a fluid-adjustable link.

11. The dual shear blade assembly of claim 9 wherein said actuating link means is a screw threadably adjustable rigid link.

12. The dual shear blade assembly of claim 11 wherein said adjustable rigid link includes a threaded rod portion and an internally threaded cylinder portion adapted to receive it, so that with screw threaded adjustment therebetween said primary and secondary shear blades may be better interrelatably positioned for full length abutting contact at the desired location with respect to a tree being cut.

* * * * *